United States Patent [19]

Allen

[11] Patent Number: 5,694,750
[45] Date of Patent: Dec. 9, 1997

[54] PROTECTIVE, CONDITIONING, HAIR ENHANCEMENT WRAP

[76] Inventor: Deidre Allen, P.O. Box 187, La Mesa, N. Mex. 88044

[21] Appl. No.: 434,199

[22] Filed: May 3, 1995

[51] Int. Cl.⁶ ............................................ B68B 7/00
[52] U.S. Cl. ............................ 54/78; 132/273; 119/850
[58] Field of Search ............................. 54/78; 132/200, 132/273, 275; 119/850

[56] References Cited

U.S. PATENT DOCUMENTS

| | | | |
|---|---|---|---|
| D. 31,285 | 7/1899 | McClellan | 54/78 |
| 127,918 | 6/1872 | Parson et al. | 54/78 |
| 148,367 | 3/1874 | Howard | 54/78 |
| 209,737 | 11/1878 | Weide | 54/78 |
| 212,836 | 3/1879 | Briggle | 54/78 |
| 385,721 | 7/1888 | Muntz | 54/78 |
| 2,487,005 | 11/1949 | Walker | 54/78 |
| 3,347,018 | 10/1967 | Laidig | 54/78 |
| 4,972,660 | 11/1990 | Black | 54/78 |
| 5,062,256 | 11/1991 | Kingett et al. | 54/78 |
| 5,086,612 | 2/1992 | Anderson | 54/78 |
| 5,413,126 | 5/1995 | Revson | 132/273 X |

Primary Examiner—Robert P. Swiatek

[57] ABSTRACT

A Wrap used to protect, condition and enhance any hair long enough to be braided. It may be used on an animal's tail or person's head hair. It may be made from various materials and requires no assembly. No tools are used for installation or securing. Proper use by persons of any age should not damage hair. The Wrap is secured initially around hair below the tail bone or scalp. Hair is separated into sections; each section of hair is enclosed in a material strip; each strip is formed into a tube by using closures on its lengthwise edges. The tubes are then braided to the location of bottom securing device. The other tubes are then placed within the tube which has the securing device, and the braid is secured. The same securing device may be used to optionally loop a long tail, using a long Wrap. Swatting fringes, which enable the animal to protect itself from flies, and/or for decoration, may be located anywhere appropriate on the Wrap. Fringes are pulled out of the braid, so that they hang free. Installer may loop a long tail to get it off the ground.

7 Claims, 3 Drawing Sheets

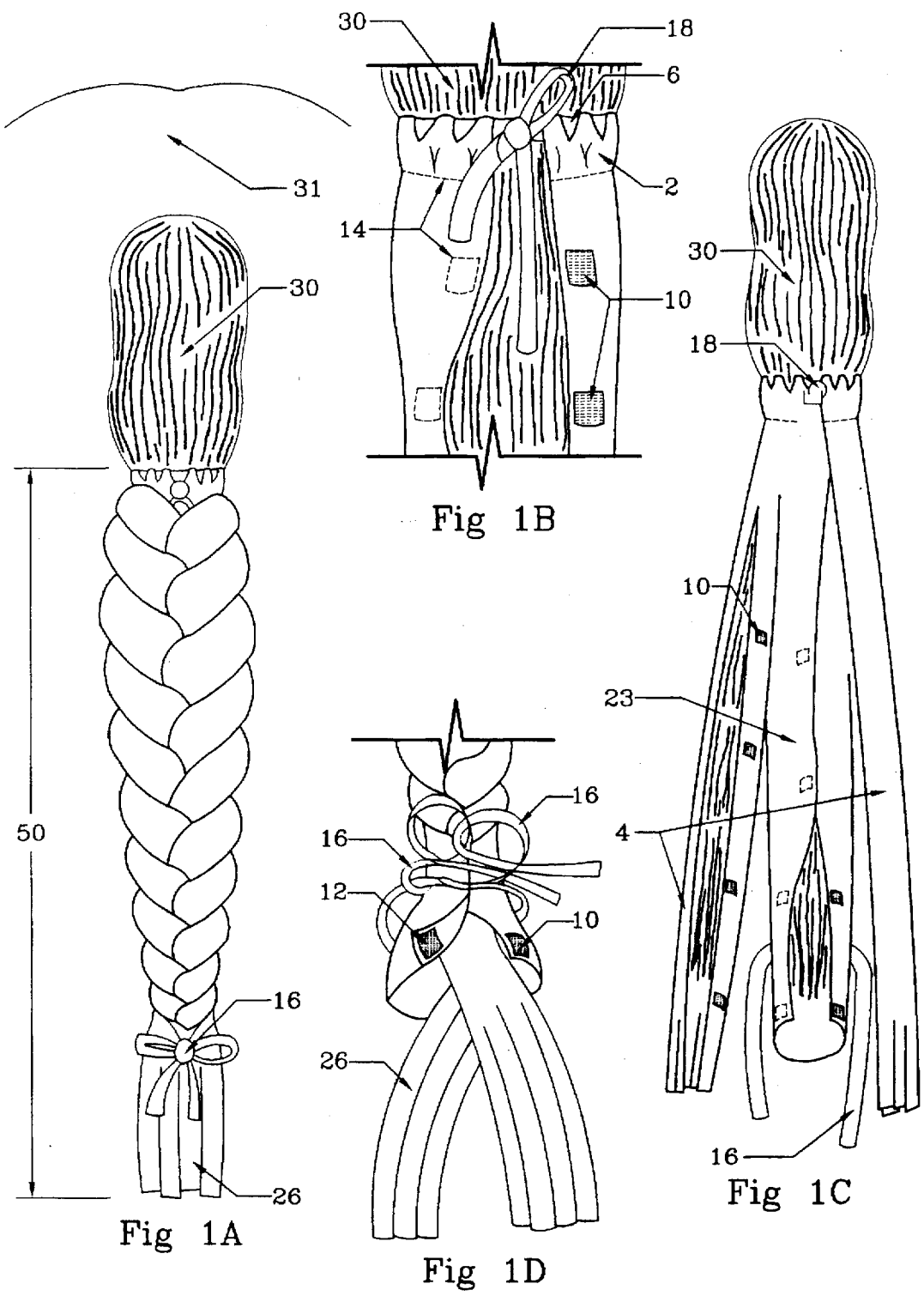

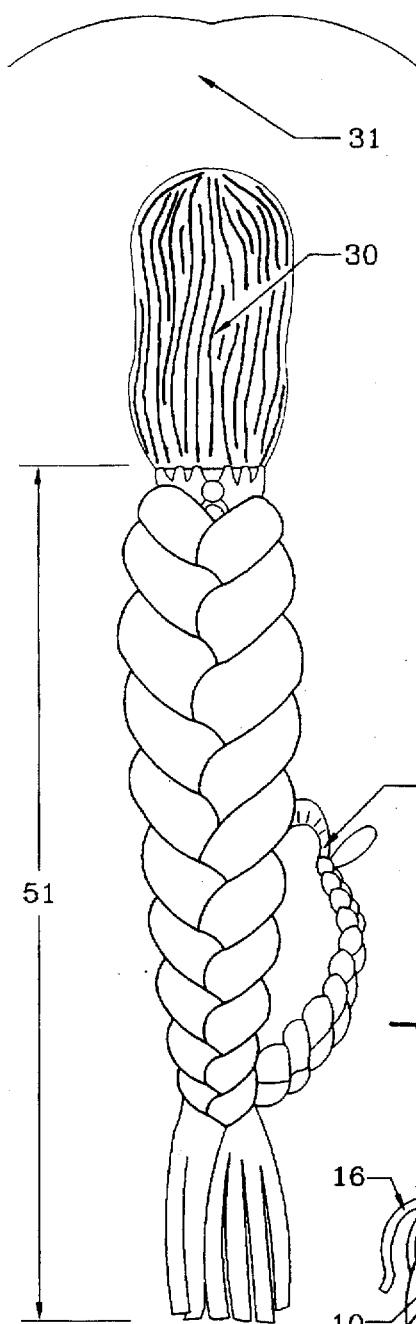
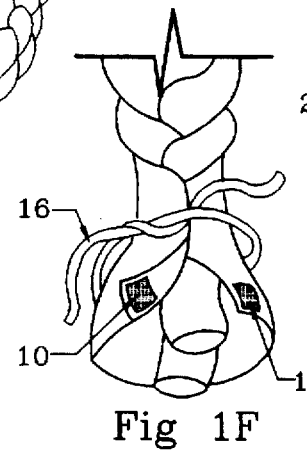
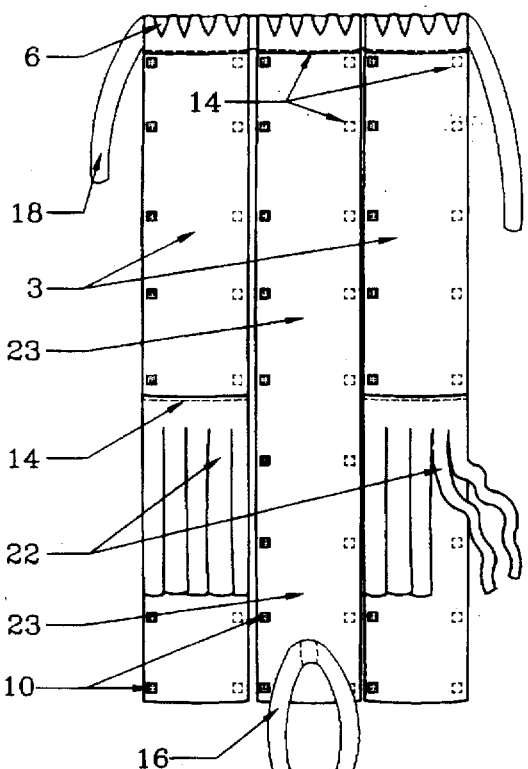
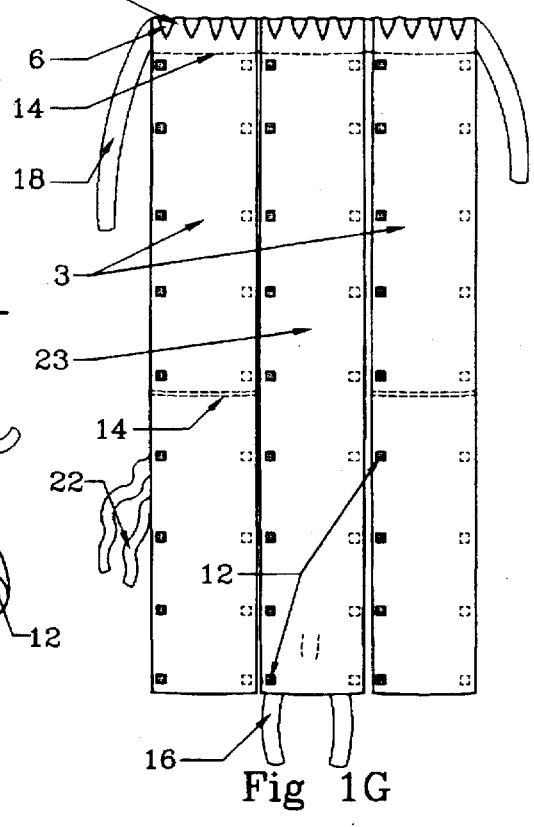

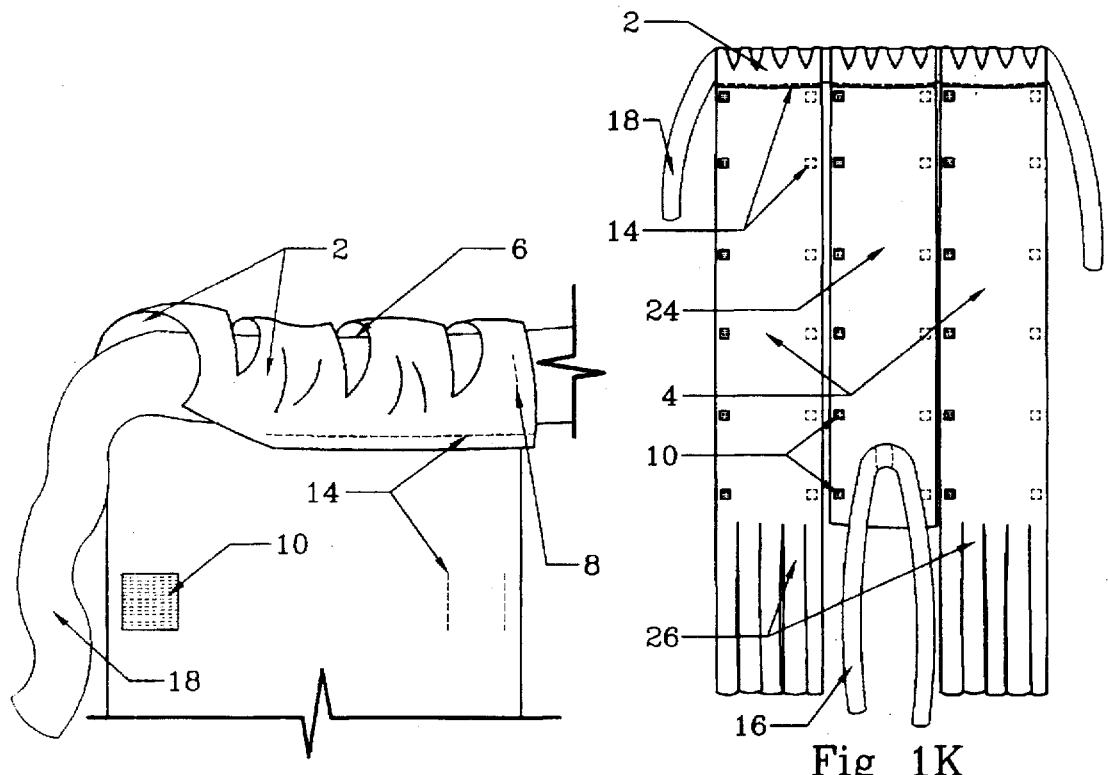
Fig 1L
Fig 1K
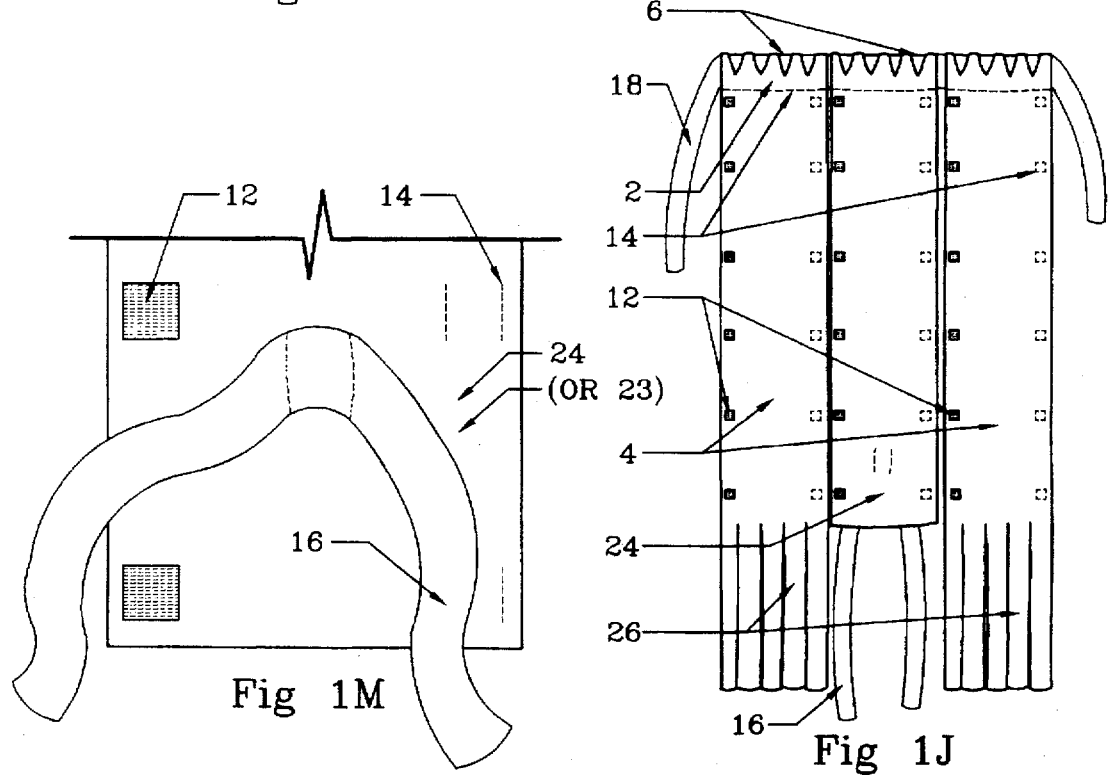
Fig 1M
Fig 1J

PROTECTIVE, CONDITIONING, HAIR ENHANCEMENT WRAP

BACKGROUND

Field of Invention

This invention relates to hair protection devices and tail holders, mainly to protect, condition and maintain the hair in a decorative fashion. When used on the tail of an animal, such as a horse, the use of the tail for fly protection is not prevented nor limited.

BACKGROUND

Discussion of Prior Art

Hair protection devices were developed and made to protect the hair, enable the hair to grow longer, and to make hair care easier. This idea has been addressed by several patents. The Tail Lengthener and Assembly in U.S. Pat. No. 5,086,612 to Anderson, Feb. 11, 1992, has five (5) parts necessary for assembly. One of these parts is a tool which must be used to hook and bend the hair to get it into each separate tube. Thus, there is risk of damaging the same hair which one is trying to protect and enhance. With five (5) parts there is risk of parts being lost, rendering the product unusable.

The Horse Tail Protector in U.S. Pat. No. 212,836 to Briggle, March 1879, covers a portion of the tail bone, making it difficult to fasten the Protector tightly without causing damage to the tail, due to possible loss or reduction of blood circulation. Also, there is a higher probability of tail damage due to itching and consequent rubbing where the Protector contacts bare skin. If one were to attach the Horse Tail protector loosely to prevent damage, the horse could easily remove it by switching its tail. Also, the horse's tail must be folded or bunched up in order to get all of it into the Protector, possibly causing damage during installation and tangling while in the Protector. This Horse Tail Protector prevents the horse from using its tail to swat flies because of its short length and location on the tail, and it may rub the rump causing sores, loss of hair, and possible scarring. The hardware can catch hair and cause tangles or damage.

The Horse Tail Braid in U.S. Pat. No. 3,347,018 to Laidig, Oct. 17, 1967, is secured to the upper portion of the tail itself, risking damage to the tail due to loss or reduction of circulation of blood. Also, because the Tail Braid is fastened to an unprotected portion of the tail, it may cause itching. Because a horse's tail tapers, the horse could easily remove the Tail Braid by switching its tail. This patent does not cover the lower portion of the horse's hair, which is the portion of the tail hair most in need of protection. This patent is really for showing purposes, not protection or hair care.

DESCRIPTION OF DRAWINGS

FIG. 1-A Wrap completely installed on a horse's tail, braid of three used for illustrations.

FIG. 1-B Wrap, on tail showing initial tying of Wrap, below tail bone.

FIG. 1-C Wrap partially installed, one strip open, ready to enclose hair, one strip partially enclosing hair, one strip fully enclosing hair, tie already tucked out of sight.

FIG. 1-D detail of finishing the end of the Wrap, with detail of slip knot.

FIG. 1-E longer variation of Wrap for longer hair, completely installed on a horse's tail and looped.

FIG. 1-F detail of finished bottom and secured braid of a long Wrap, before tail is looped up.

FIG. 1-G inside view of a long Wrap.

FIG. 1-H outside view of a long Wrap.

FIG. 1-J inside view of a standard Wrap.

FIG. 1-K outside view of a standard Wrap.

FIG. 1-L detail of sleeve.

FIG. 1-M detail of tie attached on outside, near bottom of one strip, on any and all sizes of Wrap.

REFERENCE NUMERALS IN DRAWINGS

2. Sleeve for drawstring (18), has notches (6) of material removed from upper portion of sleeve.

3. Two of the strips used to enclose hairs on longer Wrap (51).

4. Two of the strips used to enclose hairs on standard Wrap (50). Each of these strips is shown with a swatting fringe at the bottom.

6. Notches of material removed from top portion of sleeve when bulky material is used, to reduce bulk as gathered.

8. Tacking or fastening to secure drawstring (18).

10. Hook, such as Velcro (™).

12. Loop, such as Velcro (™).

14. Stitching or fastening to attach bottom tie or other fastener (16), hook (10), loop (12), drawstring sleeve (2) or attached swatting fringe (22).

16. Tie used to secure bottom of Wrap, or for looping long Wrap (51 ).

18. Top drawstring, encased in sleeve (2).

22. Swatting fringe (a separate piece of material, which has been cut into a plurality of strands for the fringe) attached on the long Wrap (51) (or on standard version).

23. Strip to enclose hair in long Wrap (51), with tie (16) attached to it.

24. Shorter strip to enclose hair in standard Wrap (50), with tie (16) attached to it.

26. Swatting fringe located on strips (4) of standard Wrap (50), made from cutting ends of material of strips (4) into strands, removing some material if necessary to allow strands to move freely.

30. Tail

31. Horse rump

50. Standard Wrap

51. Long Wrap

DESCRIPTION OF INVENTION AS ILLUSTRATED

Wrap (50) is illustrated in FIG. 1-A on an animal, a horse (31), namely on a horse's tail (30), to show this invention as it appears when installed and in use. Tail enclosure strips are herein illustrated to make braid of three, though four or more could be used. A swatting fringe may be attached to any, several, or all hair enclosure strips, at any (or more than one) location.

Inside and outside views of Wrap (50), are illustrated in FIGS. 1-J & 1-K, using a plurality of three tail enclosure strips (4 & 24). Some strips (4), have a swatting fringe (26) at the bottom of each, made from existing material in strip (4), as shown in FIGS. 1-J and 1-K, or an added piece of material (22), as shown in FIG. 1-H on the long Wrap (51), depending upon desired appearance.

A plurality of suitable closures, such as hook and loop (10 & 12), are fastened on each strip (4 & 24), by stitching (14), glue, sonic bonding, or other means of adequate attachment. These may be of various sizes and numbers depending upon the size of Wrap (50). Loops (12) are located on the inside of Wrap (50) and hooks (10) are located on the outside of Wrap (50), approximately as shown in FIGS. 1-J & 1-K, to prevent damaging contact with the hair.

The drawstring (18), is illustrated in FIG. 1-L encased in a sleeve (2), which may have a plurality of notches (6) of material removed from the upper portion of the sleeve (2) if the material is bulky, so that the top can be tied closely and secured upon initial installation. Sleeve (2) may be made from portions of strips (4 & 24) folded down in hemlike manner and secured by stitching or other means (14), or an added piece folded and attached to form a sleeve, depending upon desired appearance. Drawstring (18) is secured in place by a tacking stitch or by other means of adhesion (8), to sleeve (2). A tie (16) is illustrated in FIG. 1-M fastened with stitching or other means (14) near the lower end of strip (24).

The present invention is envisioned to be used with any style and form of suitable flexible material, with any pattern. The material may be of a plain color, or decorated with any design.

A longer version of Wrap (51) is illustrated in FIG. 1-E installed on a tail (30) of a horse (31).

Inside and outside views of Wrap (51) are illustrated in FIGS. 1-G and 1-H respectively, with a plurality of three strips (3 and 23) cut longer than for the standard Wrap, and with all three (or more) the same length. A plurality of suitable closures, such as hook and loop (10 & 12), are fastened on each strip (3 or 23), by stitching or other means (14) as for the standard Wrap (50). These may be of various sizes and numbers depending upon the size of Wrap (51). Loops (12) are located on the inside of Wrap (51) and hooks (10) are located on the outside of Wrap (51) approximately as shown in FIGS. 1-G & 1-H, to prevent damaging contact with the hair.

Drawstring (18) is at top of Wrap (51), encased in sleeve (2), as illustrated in FIG. 1-L. Sleeve (2) may have a plurality of notches (6) of material removed from the upper portion of the sleeve, if material is bulky enough to warrant it. Sleeve (2) may be made from portions of strips (3 & 23) folded down in hemlike manner and secured by stitching or other means (14), or an added piece folded and attached to form a sleeve, depending upon desired appearance. Drawstring (18) is secured in place by a tacking stitch or other means (8) to strip(s) (3 and/or 23). Tie (16) is illustrated in FIG. 1-M attached by stitching or other means (14) near the bottom of strip (23).

Swatting fringe (22) is illustrated in FIG. 1-H attached to two strips (3). This fringe is usually fastened by stitching or other means (14) at a point that will locate the fringe near the bottom of the loop when long Wrap (51 ) is fully installed and looped, approximately the middle of strips (3) in this illustration; but extra swatting fringes may be attached elsewhere for additional protection and/or decoration.

OPERATION OF INVENTION

It should be noted that these Wraps (50 and 51) can be used on different types of animals, including people, who have a compact area of hair which is long enough to be braided. The preferred embodiment is on a tail (30). For this example the tail of a horse (31) is used. Also note that it takes no special skill or training to use the Wrap (50 or 51), so it can be used by most people. The person using the Wrap (50 or 51) is herein referred to as the "installer".

The installer prepares the tail (30) prior to installing the Wrap (50 or 51). Preparation varies with the installer's preferences. But a typical preparation consists of brushing, washing and rinsing the tail (30) to remove dirt and debris, then conditioning to add moisture and shine and to remove tangles, and then finally rinsing and combing. We also recommend applying a hair conditioner from below the tail bone to the very ends (to be left on the hair) before installing the Wrap (50 or 51), for a softer, shinier, more manageable tail.

Hold the Wrap (50) at the top by the drawstring sleeve (2) and bring it around the horse's tail, below the tail bone (making sure that loops (12) are inside, towards the tail). Tie the drawstring (18) snugly with the knot of your choice (we do recommend a slip knot), which may be tucked or braided in, to be out of sight (FIGS. 1-B & 1-C).

Separate one-third of the hair and place it smoothly, lengthwise, in one of the strips (4 or 24), using hooks and loops or other closures (10 & 12) to close a tube around the hair all the way to the last of the closures (10 & 12) at the bottom (FIG. 1-C). Separate half of the remaining hair and repeat the above-described hair enclosure. Repeat again with the last third of the hair. Now you have three sections of hair, each enclosed in a strip (4 or 24) and secured by closures. It is not important in what order you enclose the hair in the strips, whether you use strips (4 or 24) first, second, or last. If some hairs have been missed, the installer can easily enclose them by just undoing a few closures (10 & 12) where the hair is out.

Take the tubes (4 & 24) and braid in a simple braid till you come to the last closure (10 & 12) on strip (24) (FIG. 1-A). Undo this closure (10 & 12) and wrap the bottom of strip (24) around the bottoms of the other strips (4). Secure the Wrap with the closure (10 & 12) on strip (24) (FIG. 1-D). Then wrap the tie or other closure (16) (located near the bottom of strip (24)) around strip (24) once or twice, and secure it (FIG. 1-D). We recommend a slip knot to make removal easier. Swatting fringes (26) should hang freely at the bottom.

If the tail (30) is long enough so that it may drag on the ground or be stepped on even after braiding, the installer uses the long Wrap (51). Installation for the long Wrap (51) is the same as for the standard Wrap (50), until braiding reaches attached swatting fringes (22) on the strips (3) (FIG. 1-H). Installer pulls these fringes (22) out of the braid at their points of attachment so that they will not be braided into the Wrap. Then the installer continues to braid below the point where these fringes (22) were pulled out. At the bottom, secure the tie or other fastener (16) (FIG. 1-F). Then, holding the fastener, pull the end of the braid up so it forms a loop. Using the fastener (16), fasten the end of the Wrap in through the braid or around the braid to secure and hold the loop up. The size of the loop is determined by the installer's needs. Swatting fringes (22) used with long Wrap (51 ) should be located at the bottom of the loop (FIG. 1-E). Additional fringes may be located elsewhere, depending upon desired appearance and swatting needs.

CONCLUSION, RAMIFICATIONS, AND SCOPE OF INVENTION

The enclosure of hair with Wrap allows for an installer to easily care for the hair in a minimum amount of time and with the utmost ease.

The installer has one item to use, nothing to assemble, no parts or tools to lose, no tools to use (as in some previous inventions).

The animal is still able to use its tail for fly swatting purposes (not the case with some prior arts, which thus cause a health hazard to the animal).

This Protective, Conditioning, Hair Enhancement Wrap doesn't cover the tail itself (which could cause the animal to rub its tail, due to itching from reduced circulation or air flow), but attaches only to the hair below the tail tip; nor does it rub on an animal's rump (which could cause sores and/or scarring, as in some prior arts).

There is no bending or manipulation of the tail to cause damage or tangles. (Several prior arts require potentially harmful methods to install or hold hair in their wraps or bags).

This invention has no hardware for hair to get tangled in or pulled out by (as in prior arts).

With this Wrap there is no braiding of hair against hair (detrimental to the hair, as in prior arts).

The Protective, Conditioning, Hair Enhancement Wrap requires no great skill or knowledge to use. It can be easily used by persons of almost any age. It is easy and economical to manufacture, can be made from a variety of durable, easy-care materials in various colors and patterns, different sizes and lengths. This provides consumers with choices to meet their needs.

This invention can be left in the hair for long periods of time, eliminating the need for frequent cleaning and brushing of the hair, saving the installer time, and benefiting the hair by reduced handling. The result is that the hair is kept in better condition: thicker and longer.

This invention aids in the conditioning of the hair by allowing the installer to apply a conditioner and leave it on for any desired length of time, without the conditioner attracting dirt, debris, bugs etc.

If medication or treatment is required, the installer has the option to treat a portion or all of the hair.

The installer has an easy, secure method of protecting an animal's tail. This is economically important because an attractive tail is an advantage in the show or sale ring.

This invention enhances a short tailed animal's ability to protect itself from flies. Animals with short tails benefit because it protects the tail, allowing it to grow, and meanwhile provides extra length with which the animal may swat flies.

The swatting fringe is decorative on horse's tail, human braid or elsewhere.

While the above descriptions contain many specifics, these should not be construed as limitations on the scope of the invention, but rather as exemplifications of one preferred embodiment thereof. Accordingly, the scope of the invention should be determined not by the embodiment(s) illustrated, but by the appended claims and their legal equivalents.

I claim:

1. A device to wrap and cover hair comprising:
   A) a plurality of material panels each comprising:
      (i) a top edge,
      (ii) a bottom edge substantially parallel to said top edge, and
      (iii) two lengthwise edges;
   B) each panel having lengthwise edge attachments, by which to hold the lengthwise edges together to form each material panel into a tube;
   C) top edges of the material panels being strung together and adapted to be attached around hair;
   D) a strap upon which the top edges are strung, of sufficient length to encircle the hair and be secured;
   E) a means to attach end portions of the bottom edges together to close and secure bottom edges said material panels.

2. A device to separate and protect portions of long hair so that they cannot rub one portion upon another comprising:
   A) a plurality of material panels, each comprising:
      (i) a top edge,
      (ii) a bottom edge substantially parallel to said top edge, and
      (iii) two lengthwise edges;
   B) each panel, adapted to cover a portion of hair, having lengthwise edge attachments by which to hold lengthwise edges together to form each material panel into a tube, so that these tubes can enclose separate portions of the hair, laid gently within them, without tool, bending or pulling;
   C) top edges of the material panels being strung together and adapted to be tied around hair;
   D) a strap upon which the top edges are strung, of sufficient length to encircle the hair add be secured;
   E) a means to attach end portions of the bottom edges together to close and secure bottom edges of said material panels.

3. A device to protect and condition hair, which will remain in place even when the hair is actively swished about, comprising:
   A) a plurality of material panels, each comprising:
      (i) a top edge,
      (ii) a bottom edge substantially parallel to said top edges, and
      (iii) two lengthwise edges;
   B) each panel having lengthwise edge attachments by which to hold lengthwise edges together to form each material panel into a tube or to open such tube, the tubes, each containing portions of the hair, then braided together firmly;
   C) top edges of the material panels being strung together and adapted to be attached around hair;
   D) a strap upon which the top edges are strung, of sufficient length to encircle the hair and be secured;
   E) a means to attach end portions of the bottom edges together to close and secure bottom edges of said tubular shaped material panels.

4. A device to protect and condition hair in which a treatment may be applied to portions or all of the hair and left in place without affecting other portions or attracting dust and debris, comprising:
   A) a plurality of material panels each comprising:
      (i) a top edge,
      (ii) a bottom edge substantially parallel to said top edge, and
      (iii) two lengthwise edges;
   B) each panel having lengthwise edge attachments, by which to hold the lengthwise edges together to form each material panel into a tube, which tubes together adapted to enclose all or a portion of the hair below a tail bone or scalp;
   C) top edges of the material panels strong together to be attached around hair to partially close off and reduce the diameter of the top edges so attached;
   D) a strap upon which the top edges are strung, of sufficient length to encircle the hair and be secured;
   E) a means to attach end portions of the bottom edges together to close and secure bottom edges of said material panels so that no enclosed hair is exposed.

5. A device which, while protecting hair, will not absorb moisture, natural oils, or applied conditioner or treatment, comprising:

A) a plurality of panels of any appropriate material, especially material which is non-absorbent and non-abrasive, comprising:
   (i) a top edge,
   (ii) a bottom edge substantially parallel to said top edge, and
   (iii) two lengthwise edges;
B) each panel having lengthwise edge attachments, by which to hold the lengthwise edges together to form each material panel into a tube or to open such tube;
C) top edges of the material panels being strung together and adapted to be attached around hair;
D) a strap upon which the top edges are strung, of sufficient length to encircle the hair and be secured;
E) a means to attach end portions of the bottom edges together to close and secure bottom edges of said material panels.

6. A device for protecting tail hair of an animal while allowing it to effectively swat flies, and which may be used for decoration, comprising:
A) a plurality of material panels each comprising:
   (i) a top edge,
   (ii) a bottom edge substantially parallel to said top edge, and
   (iii) two lengthwise edges;
B) each panel having lengthwise edge attachments by which to hold the lengthwise edges together to form each material panel into a tube;
C) top edges of the material panels being strung together and adapted to be attached around hair;
D) a strap upon which the top edges are strung, of sufficient length to encircle the hair and be secured;
E) a means to attach end portions of the bottom edges together to close and secure bottom edges of said material panels;
F) one or a plurality of swatting fringes on said panels.

7. A device adapted to be installed as a closure over hair to be protected, by means of a top band which may be a sleeve containing a drawstring, elastic, or other device or band form, comprising:
A) a plurality of material panels each comprising:
   (i) a top edge,
   (ii) a bottom edge substantially parallel to said top edge, and
   (iii) two lengthwise edges;
B) each panel having lengthwise edge attachments, by which to hold the lengthwise edges together to form each material panel into a tube or to open such tube;
C) top edges of the material panels being strung together and adapted to be attached around hair;
D) a strap upon which the top edges are strung, of sufficient length to encircle the hair and be secured;
E) a means to attach end portions of the bottom edges together to close and secure bottom edges of said material panels.

* * * * *